F. H. BAUMGARD.
DRIP CATCHER FOR CANDY KETTLES.
APPLICATION FILED APR. 30, 1913. RENEWED AUG. 18, 1915.
1,175,921.
Patented Mar. 21, 1916.
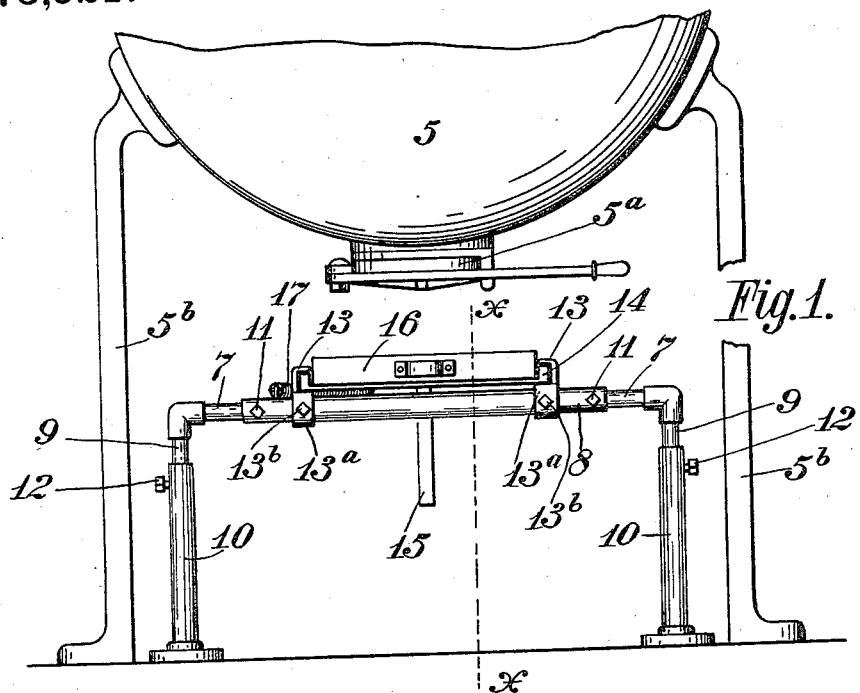
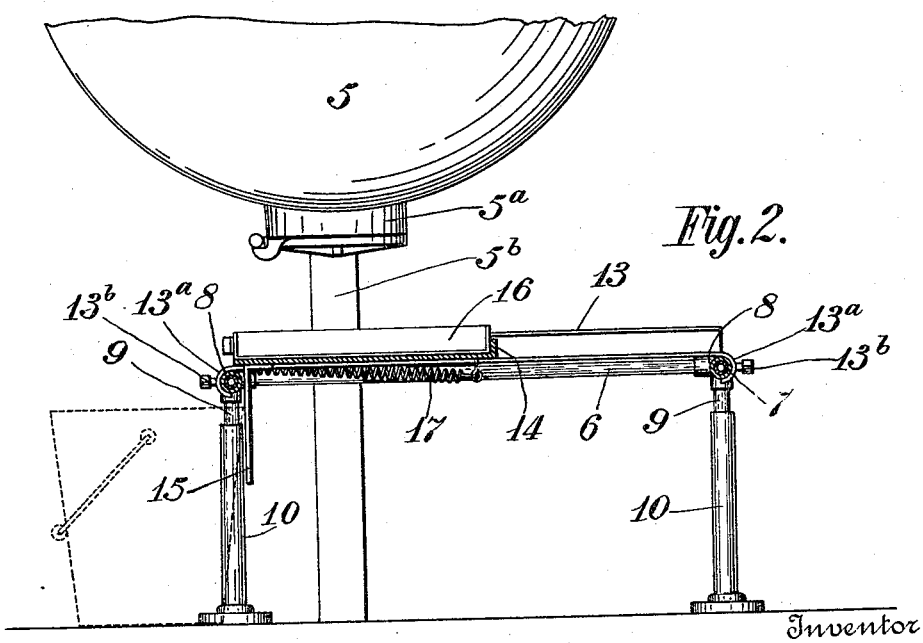
Witnesses
Benjamin Finckel
Ada G. Gambs
Inventor
Frank H. Baumgard
by Finckel & Finckel
his Attorneys

UNITED STATES PATENT OFFICE.

FRANK H. BAUMGARD, OF COLUMBUS, OHIO.

DRIP-CATCHER FOR CANDY-KETTLES.

1,175,921.
Specification of Letters Patent.
Patented Mar. 21, 1916.

Application filed April 30, 1913, Serial No. 764,545. Renewed August 18, 1915. Serial No. 46,204.

*To all whom it may concern:*

Be it known that I, FRANK H. BAUMGARD, a citizen of the United States, residing at Columbus, in the county of Franklin and State of Ohio, have invented a certain new and useful Improvement in Drip-Catchers for Candy-Kettles, of which the following is a specification.

Heretofore, so far as I am aware, no provision has been made for catching and saving the drippings from the discharge of a candy making kettle when the discharge is opened from time to time to draw quantities of the candy mixture from the kettle. These drippings have been, so far as I am aware, allowed to drop onto the floor where they become soiled and unfit for use. In the aggregate these drippings in the course of a year, make a very considerable quantity, especially in a candy factory where a large number of kettles are used and their loss works a corresponding diminution in the profits of the business.

The object of the present invention is to provide means whereby these drippings are saved for remelting or for working into marketable product, and the invention is embodied in the improved construction herein shown and described and claimed.

In the accompanying drawing—Figure 1 is a front elevation showing my invention in position under a fraction of a kettle. Fig. 2 is a side view of the kettle also showing my invention in position under the kettle but in vertical section on the line x—x Fig. 1.

In the views 5 designates any ordinary kettle for melting the candy mixture having a valve 5ª for discharging the contents or portions thereof and legs 5ᵇ by which the kettle is supported so that the discharge valve is located somewhat above the floor.

My invention as embodied in the construction shown in drawings comprises a frame including a pair of parallel side bars 6 each having at each of its ends horizontal stems or bars 7 that telescope into horizontal tubes 8 and vertical stems or bars 9 that telescope into vertical posts or standards 10 so that the frame is adjustable horizontally to fit between the legs of large or small kettles and vertically to fit under high or low kettles, or for the purpose of permitting a large vessel, if desired, to be placed under the kettle's valve if the size and position of the kettle admit of that. The parts of the frame are fixed after horizontal adjustment by set screws 11 in the tubes 8 pinching the bars 7 and after vertical adjustment by set screws 12 in the vertical posts or standards pinching the vertical bars 9.

13 are grooved parallel straight tracks or guides having hooks 13ª hooking around the horizontal tubes 8, said hooks 13ª having set screws 13ᵇ engaging the tubes 8 to secure the tracks or guides from lateral movement.

14 is a carrier or holder for the drip pan, said holder being formed like a flat lidless box with one end wall removed.

The side walls of the drip pan carrier fit in the grooves of the parallel tracks 13 and the carrier is therefore, capable of being slid back and forth between the tracks. Connecting the lower side of the drip pan carrier 14 and the forward tube 8 is a coil spring 17 to hold the carrier normally forward in the tracks and under the discharge valve of the kettle. The lower side of the carrier at its forward end is provided with a downwardly projecting tongue 15.

16 designates the drip pan, it being constructed to fit upon the box like carrier 14 so that when the carrier is moved rearward or forward the pan shall be carried with it.

The operation is this: When it is desired to draw the fluent mixture from the kettle, a bucket (shown by broken lines Fig. 2) or other suitable vessel placed on the floor against the tongue 15 and shoved rearward until the bucket or other vessel takes the pan's vertical position under the kettle's valve when the latter can be operated to draw the desired quantity of material from the kettle after which the valve is closed. The bucket is then drawn forward, the spring 17 causing the drip pan carrier and pan to automatically follow the bucket and replace the pan under the kettle's valve. Any drip, therefore, from the valve falls into the pan 16. When the accumulation of drippings becomes considerable the pan is removed and the drippings turned into the kettle for melting or it is disposed of as may be desired. The contact of the tongue with the forward tube limits the forward movement of the pan carrier.

The adjustable frame adapts the device for considerable differences in the position of the kettle above the floor and for considerable differences in the size of the vessel used in taking the contents of the kettle.

What I claim is:

1. A drip catcher comprising a support and a drip pan carrier movably mounted upon said support, in combination with means for yieldingly maintaining said carrier in a predetermined position, and means adapted to be engaged to move said carrier from said predetermined position.

2. A drip catcher comprising an adjustable support and a drip pan carrier movably mounted upon said support, in combination with means for yieldingly maintaining said carrier in a predetermined position, and means adapted to be engaged to move said carrier from said predetermined position.

3. A drip catcher comprising a support, a track upon said support and a drip pan carrier movably mounted upon said track, in combination with means for yieldingly maintaining said carrier in position, and means adapted to be engaged to move said carrier from said predetermined position.

4. A drip catcher comprising an adjustable support a track upon said support, a drip pan carrier movably mounted upon said track, in combination with means for yieldingly maintaining said carrier in a predetermined position, and means adapted to be engaged to move said carrier from said predetermined position.

5. A drip catcher comprising a receptacle, a movable carrier for said receptacle and means for yieldingly holding said carrier in a predetermined position.

FRANK H. BAUMGARD.

Witnesses:
 BENJAMIN FINCKEL,
 GEORGE M. FINCKEL.

Copies of this patent may be obtained for five cents each, by addressing the "Commissioner of Patents, Washington, D. C."